INVENTOR.
Stanley J. Lievense
BY
ATTORNEY.

United States Patent Office 3,495,350
Patented Feb. 17, 1970

3,495,350
FISHING FLY WITH MOTION REGULATING SCOOP
Stanley James Lievense, 355 Boichot Road,
Lansing, Mich. 48906
Filed May 2, 1968, Ser. No. 726,027
Int. Cl. A01k 85/08
U.S. Cl. 43—42.25    8 Claims

ABSTRACT OF THE DISCLOSURE

A fish hook with a body-simulating winding on its shank, a group of tail-simulating hairs bound to the shank and projecting from the rear of the body, a larger group of longer hairs simulating wings bound to the top of the shank and projecting rearwardly over the top of the body, and an open topped U-shaped plastic member fitting around the bottom and sides of the forward end of the body winding and secured thereto by a second winding extending along and across the forward end of the body; the plastic member extending forwardly in embracing relation to the eye of the hook and curving downwardly in a transversely widened and forwardly and upwardly opening scoop.

Outline of invention

The object of the invention is to provide a wet fly with a more active, lifelike motion when being retrieved without adversely affecting the desirable light weight casting properties of the fly. A plastic scoop attached to the fly is light weight and projects forwardly and downwardly from the hook eye, so that when the fly is retrieved it is drawn somewhat downwardly and simultaneously given a side to side, wiggling or swimming action. The wing and tail simulating fibers give the fly a buoyancy and a frictional drag that are opposed to the depressing action of the scoop. The small weight of the scoop is below the body and the buoyant force of the wing material is above the shank, so that in action the fly tends to retain its upright, natural position. The embracing relation of the rear end of the scoop member with the body of the fly assures straight alignment of the scoop with the remainder of the fly.

The drawings, of which there is one sheet, illustrate a highly practical form of the invention.

Figure 1:
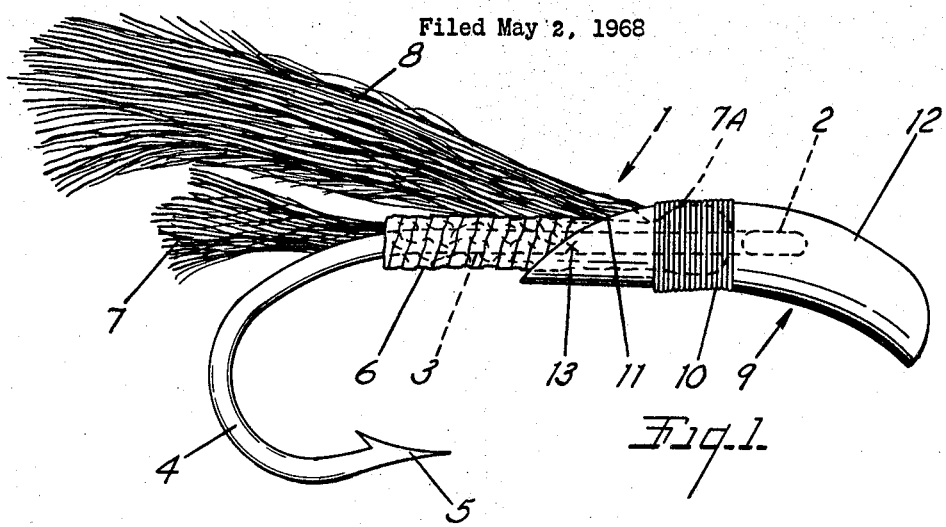
Figure 2:
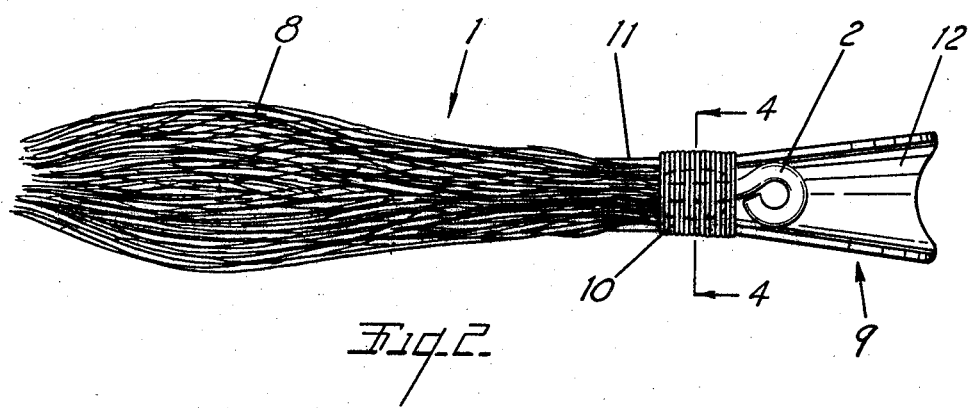
Figure 3:
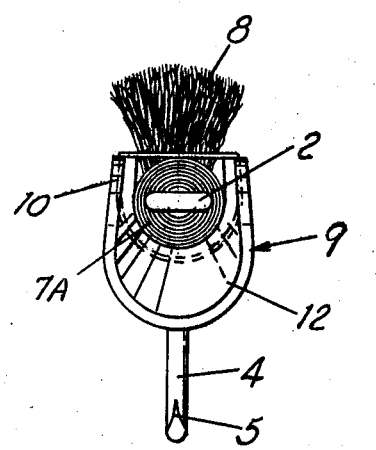
Figure 4:
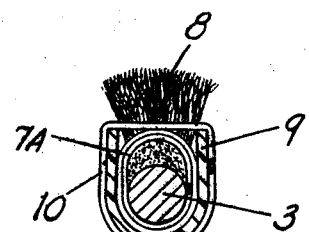

FIGURE 1 is a side elevation of the fly.
FIGURE 2 is a top plan.
FIGURE 3 is a front elevation.
FIGURE 4 is a cross section along the plane of line 4—4 in FIGURE 2.

The hook indicated in its entirety by the numeral 1 has the usual line attaching eye 2 on the front end of the shank 3, and the curved end 4 extending to the barbed point 5. Most of the shank 3 is wound with a strand or strands of thick yarn or string to form the body 6 of the fly. The yarn may have a flat strand of thin metallic tinsel twisted therein to add a bright reflective property to the body. Secured under the body winding at the rear end of the body is a small bunch or group of strands forming a rearwardly projecting simulated tail 7 on the body. Toward its forward end, the winding of the body is secured to the shank by a winding of thread 7A. The winding 7A also secures a second bunch or group of longer strands to the top of the shank to form simulated wings 8. The material of the body, tail and wings may be of any color, and may be natural or synthetic.

Desirably the strands 7 of the tail and 8 of the wings are buoyant, and the body is desirably nonabsorbent so as not to add water weight. This assists in providing a lightweight mass that tends to position the fly upright in the water. A scoop member 9 formed of lightweight plastic material, has an upwardly opening U-shaped cross section with a straight rear end that embraces a substantial length of the bottom and sides of the front of the body 6 and the winding 7A. The scoop is secured in place by an overwrap 10 of thread. The windings may be secured in any well-known manner so that hook 1, body 6, tail 7, wings 8 and scoop 9 become a unitary structure. The wing-simulating strands 8 are directed in an upward and rearwardly fashion by the sides of the scoop. The sides of the U-shaped plastic may taper downwardly and rearwardly behind the winding 10, as at 11, but this is not necessary. The significant feature of the rear portion of the scoop is that is contacts a substantial portion of the length of the body, and so is aligned accurately with the body, and the shank of the hook.

Forwardly of the winding 10, the sides of the scoop member flare outwardly and the bottom curves downwardly as at 12 to form a forwardly and upwardly opening expanding scoop face that extends forwardly of the eye 2 and downwardly about three-quarters of the way to the level of the barb 5. The widest part of the scoop is at the front, and is approximately twenty-five percent wider than that part of the scoop which embraces the eye 2. The finished fly balances, longitudinally, at about the longitudinal center of the shank 3, behind the eye, at the point indicated at 13. This places part of the mass of the wing strand 8 forwardly of the center of mass of the fly, but most of the buoyant part of the wing strands is distributed to the rear of the center of the fly. If the front of the scoop is inclined downwardly at a greater angle, i.e. presents a flatter frontal area, the end will be somewhat shorter and will not project downwardly as far as in the example illustrated. The object is to obtain a vertical balance between the several forces which act on the fly. The buoyant force of the fibers forming the tail and the wings, and the upward component of the pull on the line are opposed by the dead weight of the lure and the depressing action of the water on the scoop. The frictional drag of the wing and tail fibers is of course directed rearwardly but is further applied to the rear end of the lure. The scoop creates a drag applied to the front of the lure, ahead of the point of connection of the line to the eye. As a result, the lure finds a submerged level at which these forces equalize.

The direction of the pull by the line can vary relative to the axis of the shank, due to the flexibility of the line and its connection to the eye. An improved action is obtained if a snap or swivel is used to connect the line to the eye, but since this is an old expedient and merely increases the flexibility of the connection, the swivel is not shown or claimed as a part of the invention.

While the vertical forces on the lure seek a natural point of balance that keep the lure submerged, level and upright, the lateral forces on the lure are inherently unstable. The drag created by the scoop is applied in front of, and below the swivel connection at the eye; while the drag created by the tail and wing fibers is applied above and to the rear of the line connection. As a result, the lure swings from side to side in a natural motion which simulates the action of an immature natural fly or small fish. The overall action proves to be particularly effective in attracting or luring game fish.

When the fly is retrieved, the open front mouth of the scoop member 9 draws the fly downwardly and causes the active fly to wiggle from side to side similar to the way a fish swims. At the same time, the buoyant action of the wing strands 8, tail strands 7 and any buoyant action of the winding of the body 6 keeps the fly upright in the water. Hence the lure simulates the swimming motion of an immature natural fly or a fish.

What is claimed as new is:

1. A fishing fly having a single, straight shank, a hook with a body simulating winding on its shank and wing simulating fibers bound in rearwardly extending relation to the front end of the body, characterized by a scoop member of lightweight plastic material of self-sustaining rigidity secured in forwardly projecting relation to the front end of said body, said scoop member lying in the plane of said hook and having an upwardly opening U-shaped cross section embracing the bottom and sides of a substantial length of the forward end of said body to the height of the top of the body, the forward end of said scoop member being flared laterally outwardly along the sides of the eye of said hook and extending forwardly and downwardly in front of said eye.

2. A fly as defined in claim 1 in which said scoop member is between 1.5 and 1.7 times as wide at its front end as it is at its point of connection to said body, and is curved downwardly at the front between 1.25 and 1.35 times the height of the sides of the scoop at its point of connection to said body.

3. A fly as defined in claim 1 in which said body is transparent and there is a first winding securing the forward ends of said wing fibers to said body, and a second winding securing said scoop member to the surface of said first winding.

4. A fly as defined in claim 3 in which there are tail simulating fibers secured to said shank and projecting rearwardly and upwardly from the rear of said body.

5. A fly as defined in claim 4 in which said wing fibers are longer than said tail fibers and projected in spaced relation above and to the rear of the tail fibers, both said wing fibers and tail fibers projecting rearwardly beyond the bend in said hook.

6. A fly as defined in claim 4 in which said fibers are natural hair.

7. A fly as defined in claim 2 in which the center of gravity of the fly lies forwardly of the center of the length of the hook and rearwardly of the point where said wing fibers are secured to said shank.

8. A fly as defined in claim 6 in which the center of gravity is between 36 and 42 percent of the length of the hook from its front end.

References Cited

UNITED STATES PATENTS

| | | | |
|---|---|---|---|
| 2,216,688 | 10/1940 | Harvey | 43—42.28 X |
| 2,306,005 | 12/1942 | Thomas | 43—42.28 X |

FOREIGN PATENTS

| | | |
|---|---|---|
| 470,642 | 1/1951 | Canada. |
| 59,407 | 1/1954 | France. |

SAMUEL KOREN, Primary Examiner

DANIEL J. LEACH, Assistant Examiner

U.S. Cl. X.R.

43—42.28, 42.37, 42.5